(12) United States Patent
Yahata

(10) Patent No.: US 8,300,121 B2
(45) Date of Patent: Oct. 30, 2012

(54) IMAGE APPARATUS AND IMAGE PROCESSING METHOD

(75) Inventor: Kazuhiro Yahata, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 12/950,581

(22) Filed: Nov. 19, 2010

(65) Prior Publication Data

US 2011/0128421 A1 Jun. 2, 2011

(30) Foreign Application Priority Data

Dec. 1, 2009 (JP) ................... 2009-273997

(51) Int. Cl.
*H04N 5/217* (2006.01)
*H04N 5/228* (2006.01)
*G06K 9/40* (2006.01)

(52) U.S. Cl. ........ 348/241; 348/222.1; 382/260

(58) Field of Classification Search ............... None
See application file for complete search history.

(56) References Cited

U.S. PATENT DOCUMENTS

| | | | | |
|---|---|---|---|---|
| 2006/0239549 A1* | 10/2006 | Kelly et al. | ........ | 382/167 |
| 2006/0256226 A1* | 11/2006 | Alon et al. | ........ | 348/335 |
| 2006/0285002 A1* | 12/2006 | Robinson et al. | ........ | 348/335 |
| 2010/0079626 A1* | 4/2010 | Hatakeyama | ........ | 348/241 |

FOREIGN PATENT DOCUMENTS

JP 2007-183842 7/2007

* cited by examiner

*Primary Examiner* — Justin P Misleh
(74) *Attorney, Agent, or Firm* — Fitzpatrick, Cella, Harper & Scinto

(57) ABSTRACT

An image capturing apparatus includes an image obtaining unit adapted to obtain a captured image of an object captured by an imaging optical system, a parameter value setting unit adapted to set a value of a parameter indicating a factor determining optical characteristics of the imaging optical system, an optical characteristics obtaining unit adapted to obtain optical characteristics of the imaging optical system during capture of the captured image, a recovery filter determining unit adapted to determine a recovery filter to be used for correcting deterioration of the image quality of the captured image due to optical characteristics of the imaging optical system, based on the obtained optical characteristics and the value of the parameter, and an image recovery unit adapted to perform recovery processing by applying the recovery filter to the captured image. The factor determining optical characteristics does not depend on only an optical design parameter of the imaging optical system.

10 Claims, 9 Drawing Sheets

F I G. 5
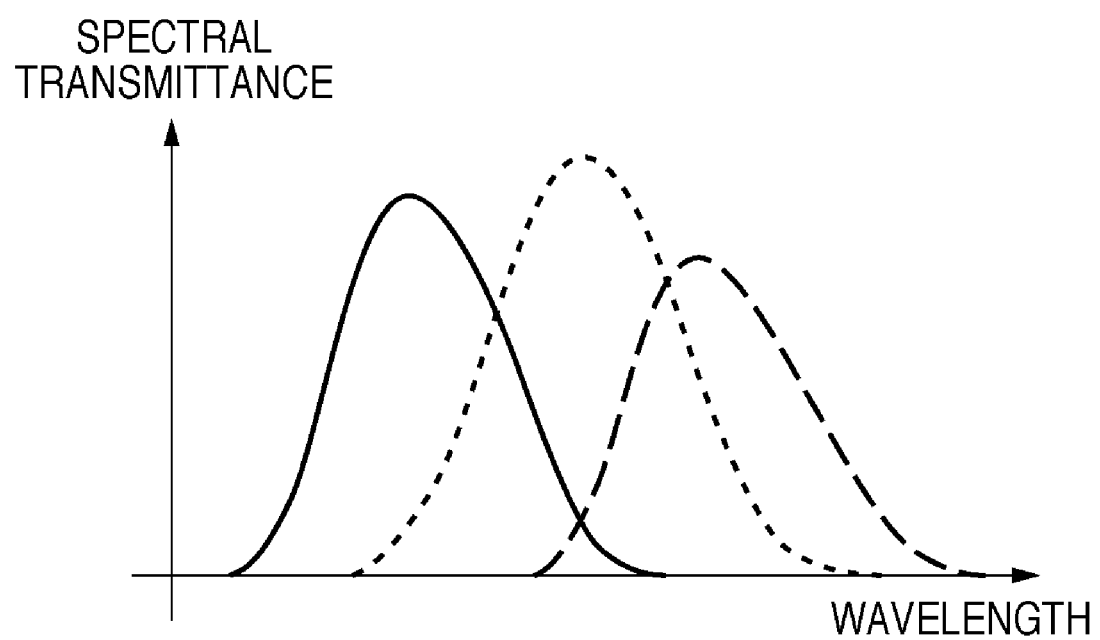

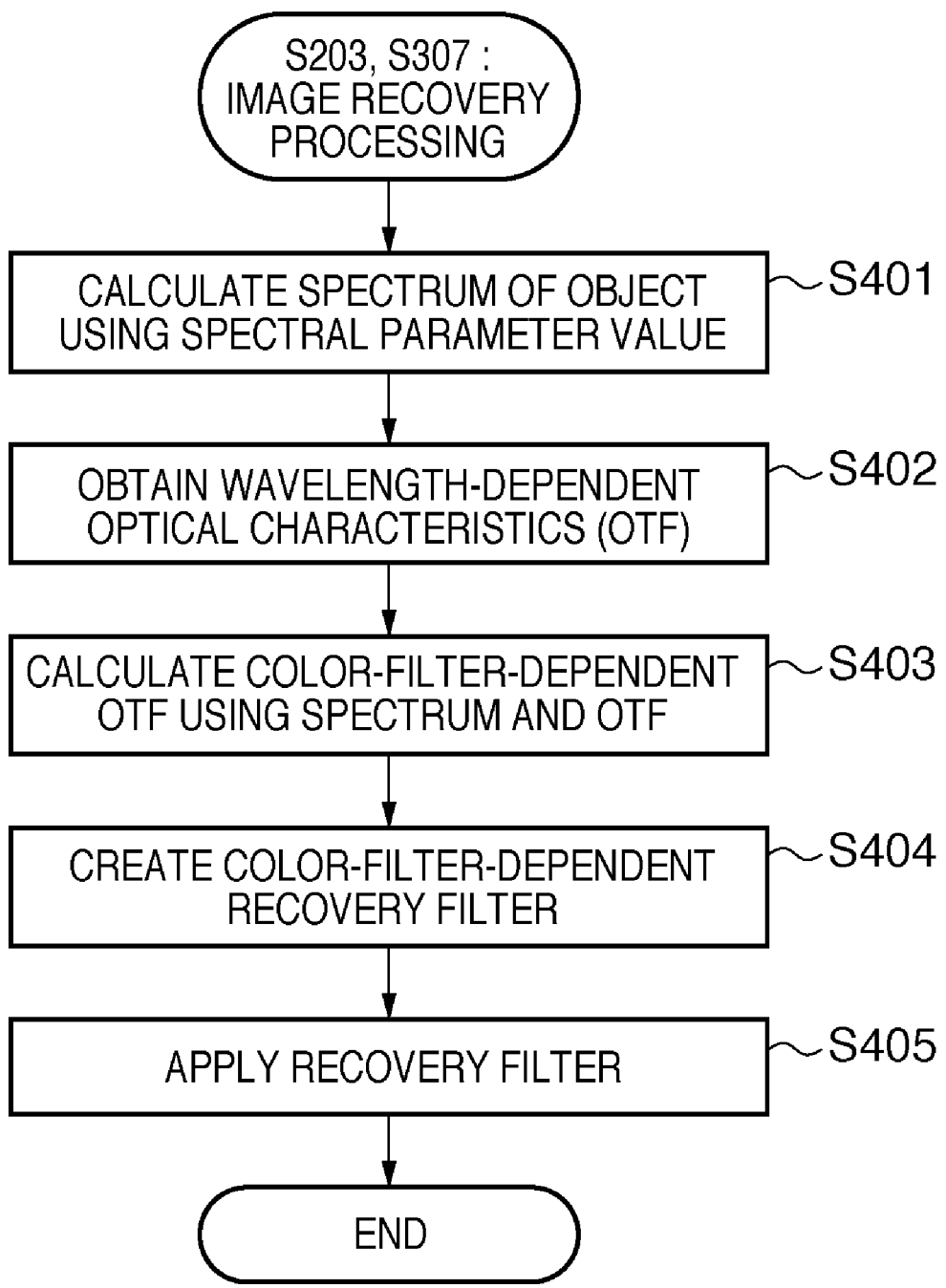

IMAGE APPARATUS AND IMAGE PROCESSING METHOD

BACKGROUND OF THE INVENTION

1. Field of the Invention

The present invention relates to an image capturing apparatus for obtaining an image captured by an imaging optical system and an image processing method that reduces deterioration of the image quality of the image due to optical characteristics of the imaging optical system by an image recovery operation.

2. Description of the Related Art

In the case of capturing an image of an object through an imaging optical system, there are cases where the captured image exhibits some blurring or has undesirable coloring (hereinafter referred to as "aberration") due to aberration of the imaging optical system, defocusing, light diffraction, and so on. In response, an image processing technique has been developed in which such blurring and aberration are eliminated from the captured image, using optical characteristics (for example, a point spread function, which is hereinafter referred to as a "PSF") of the imaging optical system (see Japanese Patent Laid-Open No. 2007-183842, for example). Such image processing is hereinafter referred to as "image recovery".

Now, the principles of image recovery will be described in short. If f is a captured image and noise is sufficiently small, f is obtained by a convolution of an image d obtained after recovery (hereinafter referred to as a "recovered image") and a PSF p, as seen from the following Equation (1). The asterisk * in Equation (1) represents a convolution operation.

$$f = d * p \quad (1)$$

In general, although p depends on the position in the captured image, Equation (1) can be approximated to the following Equation (2) by a Fourier transform in a range where dependency is considered to be low.

$$F = D \times P \quad (2)$$

In Equation (2), F, D, and P are spectrums of f, d, and p, respectively, which are obtained by a Fourier transform, and in particular, P is referred to as an optical transfer function (OTF). Also, x represents a computation for obtaining a product at each point in the image.

Here, f can be obtained by image capture, and thus if p is known, then image recovery can be performed as follows.

In the case of performing an image recovery operation in frequency space, Equation (3) is obtained by dividing F by P in Equation (2), and D is obtained from the known F and P.

$$D = F/P \quad (3)$$

The recovered image d can thus be obtained by performing an inverse Fourier transform of D obtained from Equation (3).

In the case of performing an image recovery operation in real space, Equation (3) is transformed into the following Equation (4), and both sides of Equation (4) are subjected to an inverse Fourier transform, so that Equation (5) is obtained.

$$D = F \times (1/P) \quad (4)$$

$$d = f * r \quad (5)$$

Note that, in Equation (5), r is obtained by an inverse Fourier transformation of (1/P), and the resultant recovered image d equals a convolution of the captured image f and the value r.

As described above, in order to recover a captured image from blurring or aberration properly, optical characteristics (such as a PSF) in the imaging optical system need to be known. In general, optical characteristics are considered to be determined by optical design parameters of the optical system that include an F number and a focal length, zooming, and so on during image capture.

Meanwhile, a technique has also been disclosed in which the amount of recovery during image recovery using optical characteristics is controlled by introducing parameters that change the amount of recovery continuously from "no recovery" to "recovery as specified by optical design parameters" (see Japanese Patent Laid-Open No. 2007-183842, for example).

However, optical characteristics of the imaging optical system during actual image capture are determined by various factors that cannot be determined by only optical design parameters. Conceivable examples of such factors determining optical characteristics include the spectrum bias of an object, and defocusing of a photographer's intended object. If optical characteristics during actual image capture differ from those calculated from only optical design parameters (hereinafter referred to as "design optical characteristics") because of such factors determining optical characteristics (hereinafter, factors), even if recovery processing is performed using the design optical characteristics, the image cannot be recovered properly. Furthermore, if there is a large discrepancy, that is, a large error, between varying optical characteristics during actual image capture and design optical characteristics, there is a problem in that image quality may instead deteriorate by performing recovery processing using the design optical characteristics.

The present invention has been developed in light of the above-described problems, and aims to provide an image capturing apparatus that obtains a favorable recovered image by performing image recovery taking into consideration variations in optical characteristics of an imaging optical system, and to provide an image processing method.

SUMMARY OF THE INVENTION

As a means for achieving the aims described above, the present invention provides an image capturing apparatus with the following configuration.

According to one aspect of the present invention, there is provided an image capturing apparatus comprising: an image obtaining unit adapted to obtain a captured image of an object captured by an imaging optical system; a parameter value setting unit adapted to set a value of a parameter indicating a factor determining optical characteristics of the imaging optical system; an optical characteristics obtaining unit adapted to obtain optical characteristics of the imaging optical system during capture of the captured image; a recovery filter determining unit adapted to determine a recovery filter to be used for correcting deterioration of the image quality of the captured image due to optical characteristics of the imaging optical system, based on the obtained optical characteristics and the value of the parameter; and an image recovery unit adapted to perform recovery processing by applying the recovery filter to the captured image, wherein the factor determining optical characteristics does not depend on only an optical design parameter of the imaging optical system.

Further features of the present invention will be apparent from the following description of exemplary embodiments with reference to the attached drawings.

BRIEF DESCRIPTION OF THE DRAWINGS

FIG. 5 is a graph showing the form of a spectral transmittance of a general color filter.

FIG. 7 is a flowchart showing the details of the image recovery processing according to the first embodiment.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Apparatus

Figure 1:
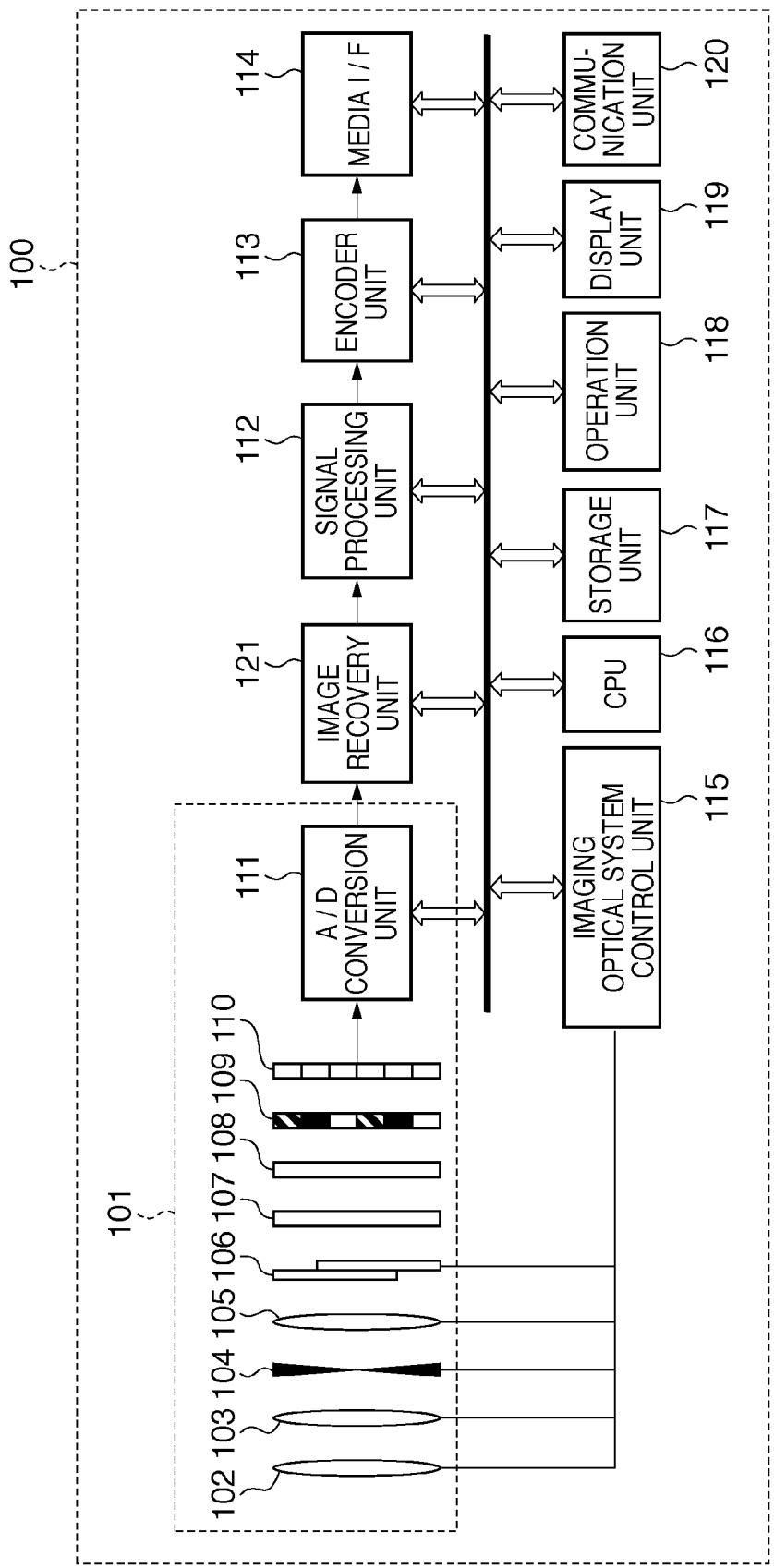
FIG. 1 is a block diagram illustrating a configuration of an image capturing apparatus according to a first embodiment.

FIG. 1 is a diagram illustrating a configuration of an image capturing apparatus 100 according to the present embodiment. The image capturing apparatus 100 has the following configuration in order to obtain a digital image of an object.

Reference numeral 101 designates an imaging optical system configured to obtain an image according to the present embodiment, and to output an image of an object as a raw digital image. In the imaging optical system 101, reference numeral 102 designates a focusing lens group that adjusts a focus position on an image capturing screen by moving back and forth on an optical axis. Reference numeral 103 designates a zoom lens group that changes the focal length of the imaging optical system 101 by moving back and forth on the optical axis. Reference numeral 104 designates an aperture that adjusts the amount of light from an object. Reference numeral 105 designates a fixed lens group that is provided in order to improve lens performance, such as telecentricity. Reference numeral 106 designates a shutter. Reference numeral 107 designates an IR cut filter that absorbs infrared radiation from an object. Reference numeral 108 designates an optical low-pass filter that prevents moire from occurring in a captured image. Reference numeral 109 designates color filters that transmit only a specific wavelength of light. Reference numeral 110 designates a sensor such as a CMOS or a CCD that converts the amount of light from an object into an analog signal. Reference numeral 111 designates an A/D conversion unit that converts the analog signal generated by the sensor 110 into a digital signal, generates a digital image of the object, and outputs the digital image from the imaging optical system 101.

Reference numeral 121 designates an image recovery unit, which is a characteristic component of the present embodiment that performs image recovery on a digital image (hereinafter referred to as a "RAW image data") output from the imaging optical system 101, based on parameters described later. Reference numeral 112 designates a signal processing unit that performs a variety of development processing and image processing for visualizing a digital image, such as demosaicing, white balance adjustment, and gamma correction, on RAW image data that has undergone image recovery and has been output from the image recovery unit 121. Reference numeral 113 designates an encoder unit that converts the digital image into a file format such as JPEG, or adds setting values (hereinafter referred to as "image capturing parameters") for the imaging optical system during image capture, such as zooming or focusing, to a digital image. Reference numeral 114 designates a media interface (hereinafter referred to as a "media I/F") through which the generated digital image is recorded on an external medium. It is also possible through the media I/F 114 to input a digital image from an external medium.

Reference numeral 115 designates an imaging optical system control unit that controls the imaging optical system 101 and thereby provides various control functions, such as adjusting the focus, setting the zoom amount, opening or closing the shutter, adjusting the aperture, and actuating the sensor. The imaging optical system control unit 115 also outputs a signal that indicates the state of the imaging optical system 101, that is, image capturing parameters, such as focus settings, zoom settings, and aperture settings, resulting from control of the optical system.

Reference numeral 116 designates a CPU that provides centralized control over processing performed by the units. Reference numeral 117 designates a storage unit that stores instructions to be executed by the CPU 116, the image capturing parameters output from the imaging optical system control unit 115, and so on. The storage unit 117 also holds information about the optical characteristics of the imaging optical system, which information is to be used for image recovery processing, and spectrum data for typical light sources. Reference numeral 118 designates an operation unit corresponding to a shutter button, a variety of setting buttons, a mode dial, a directional pad, and so on. A user instruction is transmitted through the operation unit 118 to the CPU 116. Reference numeral 119 designates a display unit that displays an image generated for display, a GUI for operating the image capturing apparatus, and so on. Reference numeral 120 designates a communication unit that transmits and receives data to and from an external device.

Image capture is started upon transmission of an instruction from a user through the operation unit 118. The transmitted user instruction is interpreted by the CPU 116 and executed in accordance with a command that has been read by the CPU 116 from the storage unit 117. When a user performs an operation for changing, for example, the zoom amount or the focus, the CPU 116 transmits a signal to the imaging optical system control unit 115, and the imaging optical system control unit 115 then moves the lens groups in accordance with that signal. The imaging optical system control unit 115 also transmits, back to the CPU 116, an image capturing parameter that has been modified by moving the lens groups, and the CPU 116 then records the image capturing parameter in the storage unit 117.

Upon detecting pressing of the shutter button by the user, the CPU 116 opens the shutter 106 for a preset period of time. Then, the CPU 116 reads out a digital image (RAW image data) from the A/D conversion unit 111, and the digital image is transmitted to the signal processing unit 112, subjected to development processing there, and then transmitted to the encoder unit 113. It should be noted that, if it is unnecessary to perform development processing on the digital image, the RAW image data is transmitted as is to the encoder unit 113 without undergoing development processing performed by the signal processing unit 112. The CPU 116 reads out an image capturing parameter recorded on the storage unit 117 and transmits the image capturing parameter to the encoder unit 113. The image capturing parameter includes information necessary to decide optical characteristics. Meanwhile, in the case where the user manually sets image capturing environmental information such as white balance, the CPU 116 transmits that information as well to the encoder unit 113. The encoder unit 113 adds the received image capturing parameter to the digital image and converts the digital image into a pre-specified file format. The digital image data generated by the encoder unit 113 is transmitted to the media I/F 114 and written on an external medium.

The following is a description of an example case according to the present embodiment, where the image recovery unit 121 performs image recovery on a digital image (RAW image data) that has not undergone development processing performed by the signal processing unit 112. However, image recovery may also be performed on a developed image if optical characteristics effective for developed images have already been found, and accordingly the present invention is not limited to image recovery performed on RAW image data. Also, in the present invention, parameters for responding to variations (shifts) in optical characteristics that cannot be determined based on only optical design parameters are introduced into image recovery. In the present embodiment, it is assumed that variations in optical characteristics due to the spectrum of an object are dealt with among multiple conceivable factors. Hereinafter, such parameters for responding to variations in optical characteristics due to the spectrum of an object are referred to as spectral parameters.

Image Recovery Processing

Figure 2:
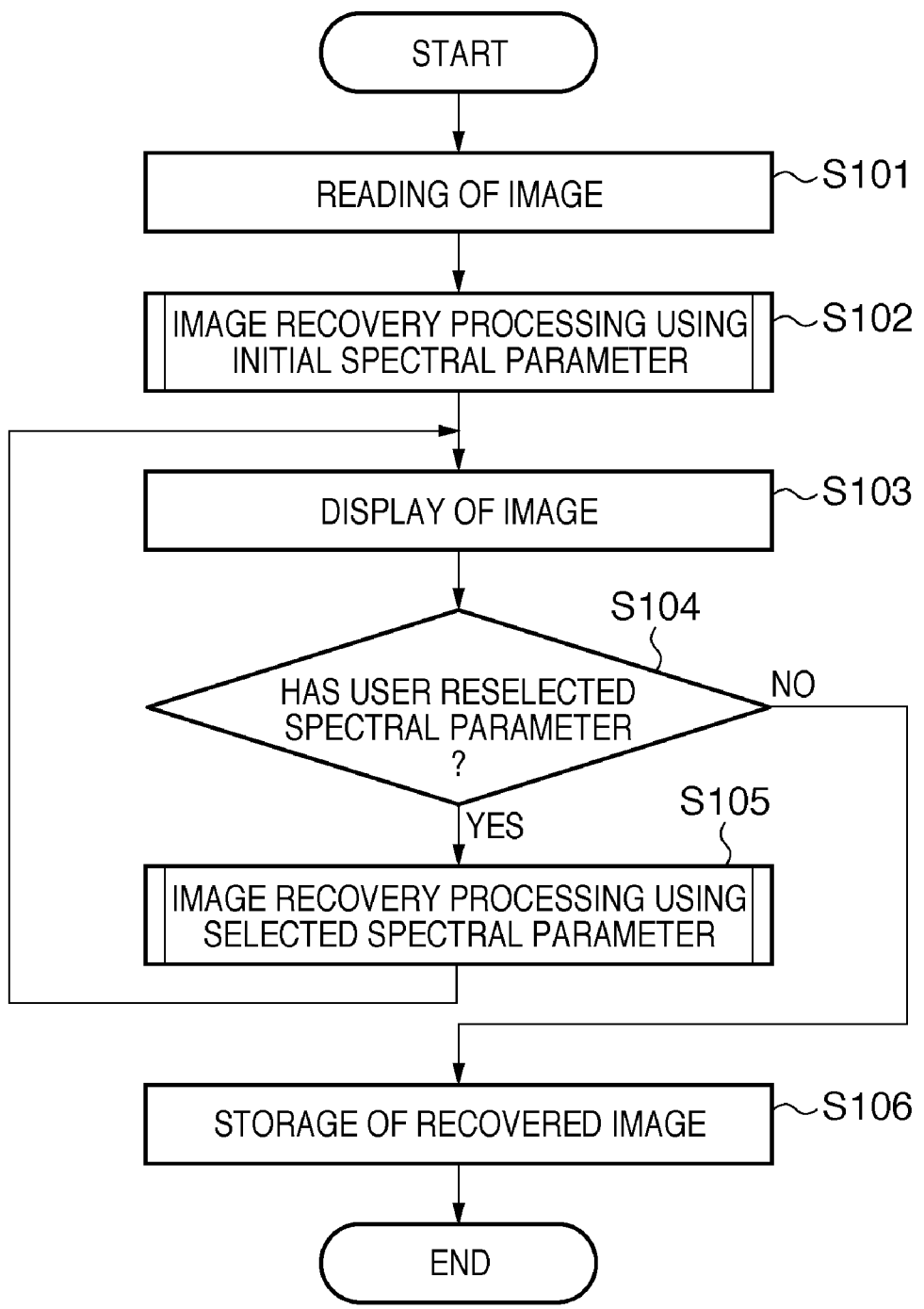
FIG. 2 is a flowchart showing image recovery processing according to the first embodiment.

The following is a description of image recovery processing performed by the image recovery unit 121 of the present embodiment, with reference to the flowchart of FIG. 2. As described above, image recovery processing is processing for correcting deterioration of the image quality of a captured image due to optical characteristics of the imaging optical system, using a recovery filter that is created based on the optical characteristics. In particular, a feature of the present embodiment is that spectral parameters as described above are used for image recovery in order to take into consideration variations in optical characteristics during image capture that cannot be determined based on only optical design parameters. Note that image recovery processing performed by the image recovery unit 121 is started upon input of a user instruction using the operation unit 118.

First, the image recovery unit 121 reads RAW image data captured by the imaging optical system 101 in step S101. Next, initial image recovery and development processing are performed on the obtained RAW image data in step S102. Although the details of the processing will be described later, spectral parameters are used for the image recovery processing according to the present embodiment, and optimum values of the spectral parameters are decided by the user after performing image recovery multiple times. However, since image recovery is performed for the first time in step S102, initial values of the spectral parameters applied in this step are set automatically.

After initial image recovery and development processing have been performed in step S102, a developed image is displayed on the display unit 119 in step S103. Here, variations in optical characteristics due to the spectrum of the object or objects in the image differ for each object. For this reason, in the present embodiment, the user checks the display provided in step S103 and determines whether or not the current image recovery state is favorable. If the image recovery state is unfavorable, the user gives an instruction to change (reselect) the spectral parameter values through a GUI described later. Specifically, it is determined in step S104 whether or not the spectral parameter values have been reselected, and if reselection has been made, the procedure proceeds to step S105. In step S105, another image recovery operation is performed on the RAW image data, based on new spectral parameter values that have been selected by the user, and the procedure returns to step S103, in which the result of recovery is displayed. Note that the details of the image recovery processing performed in step S105 will be described later. Meanwhile, if the spectral parameter values have not been reselected in step S104, it means that the current image recovery state has been determined as favorable by the user, so the procedure proceeds to step S106 without changing the spectral parameter values. In step S106, a recovered image is stored on an external medium via the media I/F 114, and then the procedure is ended. As a method for determining whether or not the parameter values have been reselected in step S104, it may be determined that reselection has been made for example if there is an input on the GUI within a predetermined period of time.

Figure 3:
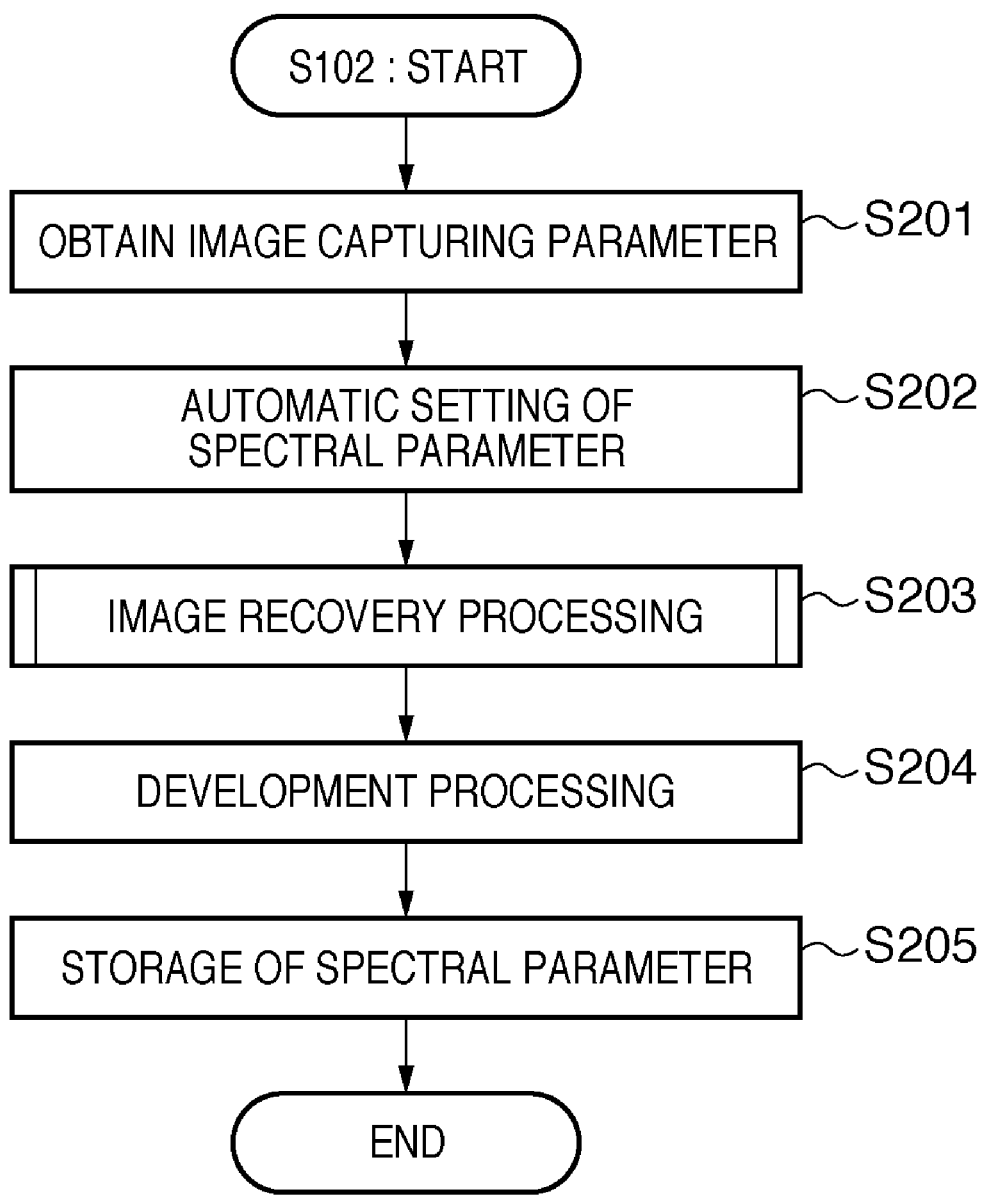
FIG. 3 is a flowchart showing an initial image recovery processing according to the first embodiment.

Now, the details of the above initial image recovery processing performed in step S102 will be described with reference to the flowchart of FIG. 3. First, an image capturing parameter stored in the storage unit 117 in association with image data that is targeted for processing is read in step S201. Then, initial values of the spectral parameters are set automatically in step S202. At this time, although the initial values of the spectral parameters are preferably set based on the captured image in order to provide as favorable a recovered image result as possible to the user, optimum values of the spectral parameters are determined by the definition of spectral parameters. The definition of the spectral parameters and a method for setting spectral parameter values based on that definition will be described later.

Next, in step S203, image recovery is performed on the RAW image data, based on the spectral parameter values set in step S202. The details of the image recovery processing will be described later. Note that, in the present embodiment, the RAW image data is kept stored in the storage unit 117 without being rewritten even after image recovery, because if the spectral parameter values are modified from the initial values, another image recovery processing based on the modified spectral parameter values will be performed on the RAW image data. After the image recovery, development processing such as demosaicing is performed in step S204, and then the spectral parameter values that have been automatically set in step S202 are stored as data for each pixel in the storage unit 117 in step S205. This is because the spectral parameter values are modified for each pixel in the present embodiment.

Figure 4:
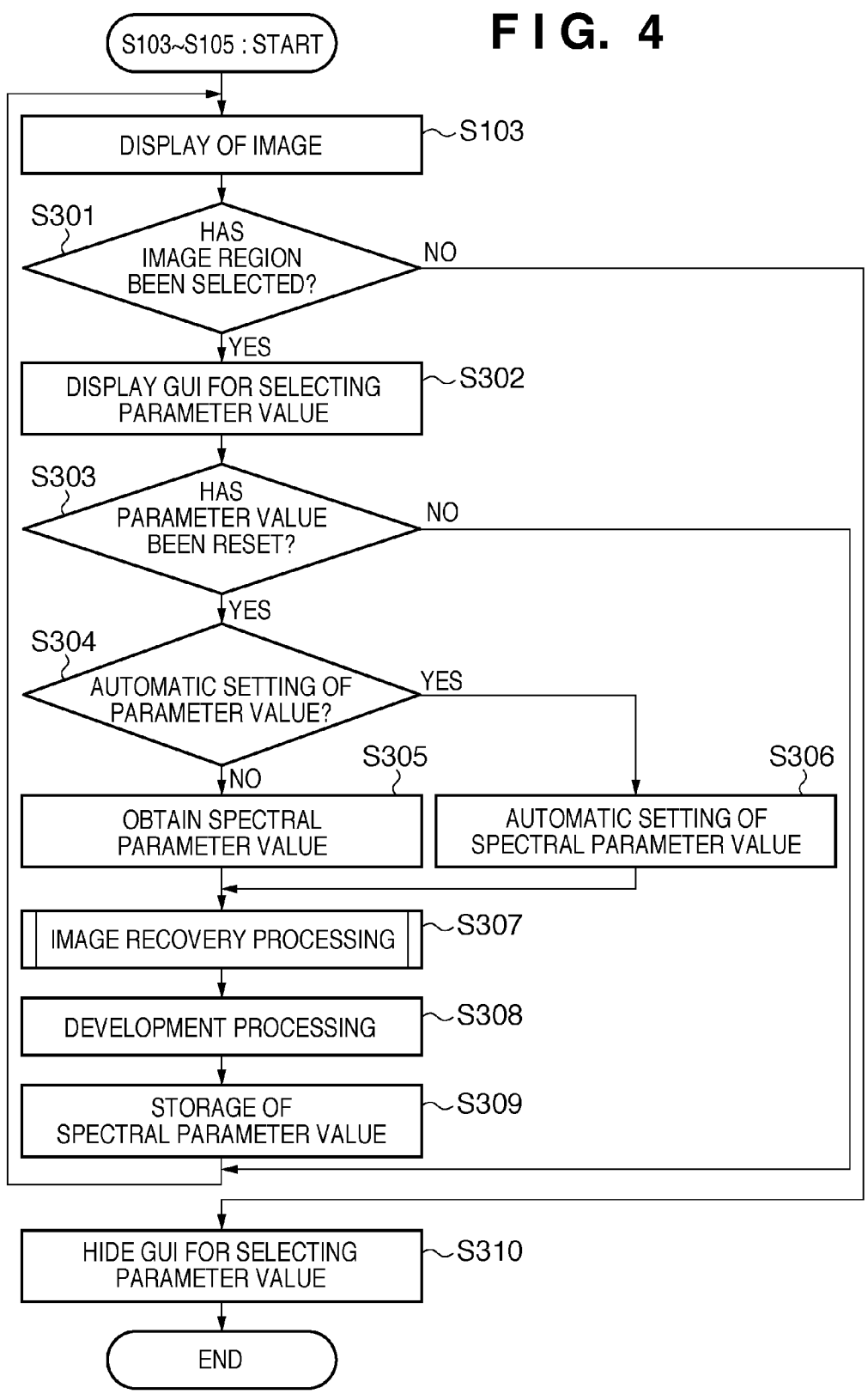
FIG. 4 is a flowchart showing a second or subsequent image recovery processing according to the first embodiment.

Next is a detailed description of the above-described second or subsequent image recovery processing performed in steps S103 to S105, with reference to the flowchart of FIG. 4. First, in step S301, the user selects a region of an object for which the user wants to change the spectral parameters, from the recovered image displayed in step S103. Although it is preferable, for example, to select regions of similar colors collectively, the method for selecting a region is not particularly limited in the present embodiment. If an image region has been selected in step S301, then a GUI for manipulating spectral parameter values for each pixel in the selected region is displayed in step S302. This GUI will be described later, together with an example of definition of spectral parameters. Then, if the user operates the GUI and gives an instruction to change (reset) the spectral parameter values in step S303, then the procedure proceeds to step S304, in which it is determined whether or not the user has instructed automatic setting of the spectral parameter values. If the instruction is not automatic setting, that is, if the parameter values have been set manually by the user, then the procedure proceeds to step S305, in which the manually set spectral parameter values are obtained, and the procedure proceeds to step S307. At this time, as to spectral parameter values for those pixels in a region that was not selected by the user in step S301, the spectral parameter values stored in step S205 are to be read and used.

On the other hand, if automatic setting of the spectral parameter values has been instructed in step S304, then the spectral parameter values are set automatically in step S306, using the same method as used to set the initial value in step S202, and the procedure proceeds to step S307.

In step S307, image recovery processing is performed on the RAW image data, based on the spectral parameter values that have been set as described above, the details of which are similar to those of the image recovery processing performed in step S203 and therefore will be described later. After the image recovery, development processing such as demosaicing is performed in step S308, and here again the RAW image data is kept stored in the storage unit 117 without being deleted.

Then, the spectral parameter values are stored as data for each pixel in the storage unit 117 in step S309, and the procedure returns to step S103, in which a recovered image is displayed on the display unit 119. If the user is satisfied with the recovered state of the image after checking the image displayed in step S103, then no region will be selected in step S301. In this case, the procedure proceeds to step S310, in which the GUI for setting spectral parameter values is deleted, and the procedure is ended. Meanwhile, if the user has not given an instruction to reset the spectral parameter values in step S303, then the procedure returns to step S301 without performing any processing.

Definition of Spectral Parameters and Method for Setting Spectral Parameters

Now, several examples are shown to describe the definition of spectral parameters and a method for setting spectral parameter values according to the present embodiment. The spectral parameters refer to parameters for deriving the spectrum $S_c(\lambda)$ of an object after having passed through the color filter 109. Here, $\lambda$ represents the wavelength of light, and the subscript c represents any of different colors of filters. The spectrum $S_c(\lambda)$ can be expressed by the following Equation (6). In Equation (6), $\sigma(\lambda)$ is the spectral reflectance of the object, and $B_c(\lambda)$ is the spectral transmittance that indicates the percentage of light that has been transmitted through the color filter 109. Also, $L(\lambda)$ is the spectrum of a light source that illuminates the object, and $L_{obj}(\lambda)$ is the spectrum of the object itself when the object emits light by itself.

$$S_c(\lambda)=(L(\lambda)\sigma(\lambda)+L_{obj}(\lambda))B_c(\lambda) \quad (6)$$

The spectral parameters according to the present embodiment represent an approximation function of $L(\lambda)$, $\sigma(\lambda)$, $L_{obj}(\lambda)$, or $S_c(\lambda)$ in the above Equation (6). Note that the spectral transmittance $B_c(\lambda)$ of the color filter 109 does not need to be approximated using spectral parameters because it is specific to the image capturing apparatus.

As shown in FIG. 5, it is often the case that the spectral transmittance $B_c(\lambda)$ of a general color filter is plotted in the form of an approximately unimodal function that is limited within a certain wavelength range. When compared with the spectral transmittance $B_c(\lambda)$, the spectral reflectance $\sigma(\lambda)$ of the object, when the object is not a fluorescent material, often appears as a gently sloping wave. Also, when the light source is sunlight, a filament lamp, or the like, the spectrum $L(\lambda)$ of the light source also appears as a gently sloping wave as compared with the spectral transmittance $B_c(\lambda)$. In view of this, an example is considered in which the product of $L(\lambda)$ and $\sigma(\lambda)$ in the above Equation (6) is approximated by a linear function as expressed by the following Equation (7), and constants included in that function are determined as spectral parameters.

$$L(\lambda)\sigma(\lambda)=a_c(\lambda-\lambda_c)+b_c \quad (7)$$

In Equation (7), $\lambda_c$ is a constant indicating a representative wavelength of a color filter indicated by c and can be calculated for example from the following Equation (8).

$$\overline{\lambda_c} = \frac{\int \lambda B_c(\lambda)d\lambda}{\int B_c(\lambda)d\lambda} \quad (8)$$

In the present embodiment, two types of constants included in Equation (7), namely an inclination $a_c$ and a constant $b_c$, are used as specific parameters for each color filter. Of the two types of spectral parameters, the inclination $a_c$ is set in accordance with a user instruction given from the GUI. Then, the constant $b_c$ can be set automatically based on the manually set inclination $a_c$ so that the pixel values for the object are a pixel value $I_c$ calculated from the following Equation (9). Note that, in Equation (9), $P_c$ is a constant used to convert the luminance of the object into pixel values, and it is decided based on the sensitivity of the image capturing apparatus and the like.

$$I_c=P_c\int_{-\infty}^{\infty}S_c(\lambda)d\lambda \quad (9)$$

Alternatively, the constant $b_c$ may be determined in an easier way, using Equation (10) that expresses the relationship when $a_c=0$.

$$I_c=P_c b_c \quad (10)$$

Moreover, in the case where the inclination $a_c$ is set automatically in step S202 or S306, computation is performed using pixel values for different color filters. For example, in the case of the R color filter, an inclination $a_R$ is approximately obtained from the following Equation (11) with the application of the above Equation (10), where $I_R$ and $I_G$ are pixel values for R and G colors, respectively. Note that $P_G$ and $P_R$ in Equation (11) are constants used to convert the luminance of the object in G and R colors, respectively, into pixel values.

$$a_R \cong \frac{b_G-b_R}{\lambda_G-\lambda_R} = \frac{I_G/P_G - I_R/P_R}{\lambda_G-\lambda_R} \quad (11)$$

Also, if it is assumed that the spectral parameters are defined as described above, the range of parameter values that can be changed by the user from the GUI may be determined so that the product $L(\lambda)\sigma(\lambda)$ does not become negative in the wavelength range of the spectral transmittance $b_c(\lambda)$.

The process described above is a method for setting spectral parameter values in the case where the light source is sunlight, a filament lamp, or the like. On the other hand, in the case where the light source is a fluorescent lamp, a mercury-vapor lamp, a sodium-vapor lamp, or the like, the spectrum $L(\lambda)$ of the light source has an emission line, and the width of this emission line is considerably narrower than the width of the spectral transmittance $B_c(\lambda)$. Accordingly, in this case, it is unfavorable to approximate the product $L(\lambda)\sigma(\lambda)$ by a linear function as expressed by the above Equation (7). Thus, the following example is conceivable for the case where the light source is a fluorescent lamp, a mercury-vapor lamp, a sodium-vapor lamp, or the like. Specifically, as expressed by the following Equations (12) and (13), only the spectral reflectance $\sigma(\lambda)$ of the object is approximated by a linear function, whereas the type of the light source is used as a spectral parameter value for the spectrum $L(\lambda)$ of the light source.

$$\sigma(\lambda)=a_c(\lambda-\lambda_c)+b_c \quad (12)$$

$$L(\lambda)=L_k(\lambda) \quad (13)$$

In Equation (13), $L_k(\lambda)$ is the spectrum of each light source, and the subscript k is the spectral parameter that specifies the type of the light source. The type k of the light source may be set by the user from the GUI. Moreover, in the case where the type k of the light source is set automatically in step S202, the type may be set based on white balance information attached to the captured image, or if there is no such attached information, it may be set to a default value of a specific fluorescent lamp.

It should be noted that, in the case as well where the light source is a fluorescent lamp, a mercury-vapor lamp, a sodium-vapor lamp, or the like, the spectral parameters $a_c$ and $b_c$ may be set using the same method as used for the above-described case where the light source is sunlight or a filament lamp. That is, the inclination $a_c$ is decided by the user from the GUI, whereas the constant $b_c$ is set automatically based on pixel values. Note that the example of spectral parameters described herein is also applicable to the case where the light source is sunlight or a filament lamp.

In the case where the object itself is a phosphor, that is, a light source, light emitted from the object has a radiation component $L_{obj}(\lambda)$ that is much higher than the reflection component $L(\lambda)\sigma(\lambda)$. In such a case, it is sufficient that the radiation component $L_{obj}(\lambda)$ is defined as expressed by the following equation (14), and k that specifies the type of the light source is used as a spectral parameter value.

$$L_{obj}(\lambda)=L_k(\lambda) \quad (14)$$

Figure 6A:
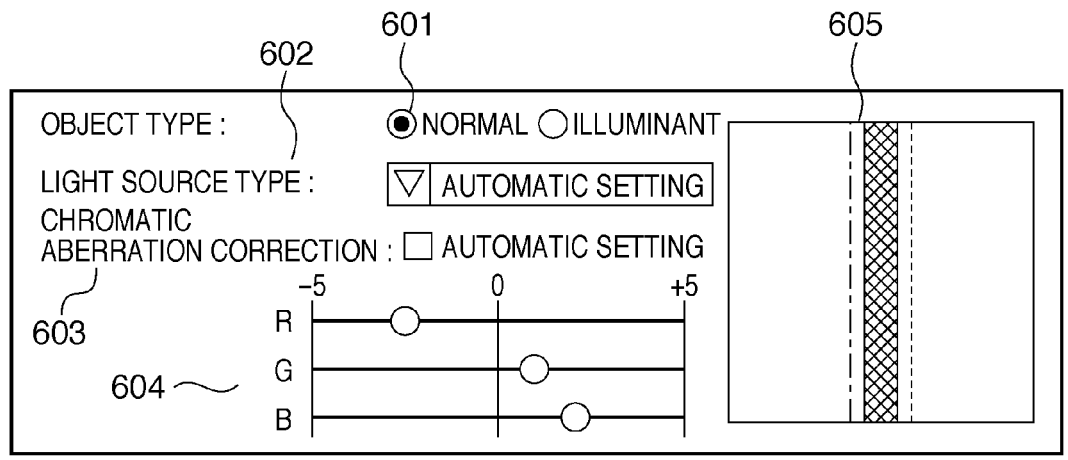
FIGS. 6A and 6B are diagrams showing an example of a GUI for setting spectral parameters according to the first embodiment.
Figure 6B:
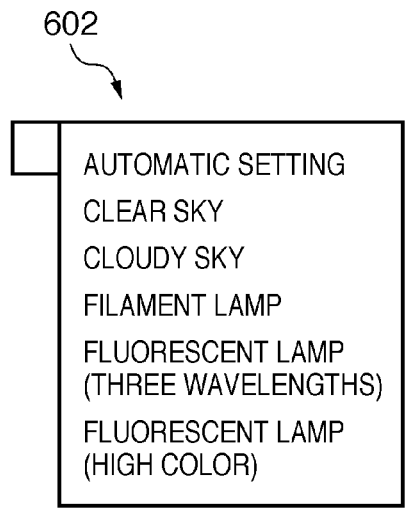

Now, an example of the GUI for setting spectral parameter values according to the present embodiment is shown in FIG. 6A. In the drawing, reference numeral 601 designates a type of button that provides a choice for multiple alternatives, with which the user selects the type of the object. Reference numeral 602 designates a menu used to select the type of the light source. By opening the menu 602, alternatives shown in FIG. 6B are displayed, the alternatives including an option to select "automatic setting" in addition to the types of the light source. Although this option indicates that the type of the light source is to be obtained automatically based on the white balance information, if there is no white balance information, this option is not included in the alternatives (not displayed). Reference numeral 603 designates a button used to select whether or not the amount of correction of chromatic aberration is set automatically, that is, whether or not the spectral parameter values are set automatically. Reference numeral 604 designates a slider that enables the user to set the above-described spectral parameter $a_c$ indicating an inclination when the type of the object selected by the button 601 is "normal". In the example of FIG. 6A, although no particular caption is provided for the slider 604, if one were to be provided, it is desirable that the caption to be provided would not be "inclination" but any caption that the user can easily and intuitively recognize the setting of the parameter value. For example, the variable values (from −5 to +5) of the slider 604 for each of RGB colors indicate the degree of correction of chromatic aberration for each color, and the inclination $a_c$ is to be set based on this set degree of correction of chromatic aberration for each color. Reference numeral 605 designates an image display region, in which a magnified image of part of the object after having undergone image recovery using the currently set parameter values is displayed and provided to the user. Accordingly, the user can easily check the effect of parameter value corrections.

Although the example of spectral parameters that are set according to the present embodiment have been described above, it is also possible to define other kinds of spectral parameters. Conceivable examples thereof include a coefficient of each term of the equation for approximating $L(\lambda)\sigma(\lambda)$ or $\sigma(\lambda)$ by a polynomial, and a peak wavelength obtained in approximating $S_c(\lambda)$ by a unimodal function having the same width as $B_c(\lambda)$ but having a different peak wavelength.

Details of Image Recovery Processing

The following describes the details of the above-described image recovery processing performed in the steps S203 and S307, with reference to the flowchart of FIG. 7. First, spectral characteristics of the object are obtained in step S401. Specifically, the spectrum $S_c(\lambda)$ of the object is calculated, for example using the above Equation (6), based on the definition and values of spectral parameters. Next, wavelength-dependent optical characteristics are obtained in step S402. Specifically, wavelength-dependent optical characteristics of light that correspond to the image capturing parameter obtained in step S201 are obtained from the storage unit 117. Here, conceivable examples of the optical characteristics include a point spread function (PSF) and an optical transfer function (OTF) obtained through Fourier transform of the PSF, and the description here is given based on the use of the OTF. Then, color-filter-dependent optical characteristics are calculated in step S403. Specifically, the OTF for a color filter c is calculated from the obtained OTF and $S_c(\lambda)$. If $T_c(k)$ is the OTF for the color filter c and $T(k,\lambda)$ is the wavelength-dependent OTF, $T_c(k)$ can be calculated from the following Equation (15). Note that, in Equation (15), k is a frequency vector.

$$T_c(k) = \frac{\int T(k,\lambda)S_c(\lambda)d\lambda}{\int S_c(\lambda)d\lambda} \quad (15)$$

Then, a color-filter-dependent recovery filter is created in step S404. Specifically, a recovery filter for performing image recovery by a convolution operation in real space is created from $T_c(k)$ obtained in step S403. Although several methods are conceivable as a method for creating a recovery filter, an inverse filter may be obtained by inverse Fourier transform of the reciprocal of $T_c(k)$, for example. As an alternative, a known Wiener filter may be created based on $T_c(k)$ in order to suppress the amplification of noise.

Then, image recovery processing is performed in step S405. Specifically, the recovery filter created in step S404 is applied to RAW image data so as to obtain a recovered image. Here, the recovery filter is applied for each pixel in the RAW image data or for each image region having a predetermined range of color. It should be noted that the image recovery processing may be applied to only a magnified portion of the image displayed in the image display region 605 on the GUI until the spectral parameter values are determined, so that the user can immediately check the result of changing the spectral parameter values on the GUI. In such a case, image display processing in step S103 is performed only on the image display region 605 on the GUI.

Note that, although an example case where image recovery is performed in real space has been described in the present embodiment, the present embodiment can also be applied in the same manner to the case where image recovery is performed in frequency space.

As described above, according to the present embodiment, the application of spectral parameters to image recovery enables the image recovery to be performed in consideration of variations in optical characteristics due to the spectrum of an object after having passed through a color filter. Accordingly, a more favorable recovered image can be obtained as compared to the conventional case.

Second Embodiment

The following is a description of a second embodiment according to the present embodiment. Although an example of performing image recovery in response to variations in optical characteristics due to the spectrum of an object has been described in the above first embodiment, in the second embodiment an example of performing image recovery in response to variations in optical characteristics due to defocus will be described. Here, defocus refers to disagreement between a distance to a user-intended object (hereinafter referred to as an "object distance") and a focal length that has been set during image capture, and the difference between the object distance and the focal length is defined as a defocus parameter. Although an example of calculating a recovery filter based on the spectral parameters during image recovery processing has been described in the above first embodiment, in the second embodiment, multiple recovery filters that correspond to multiple defocus parameters, respectively, are calculated in advance and held in the storage unit 117.

Figure 8:
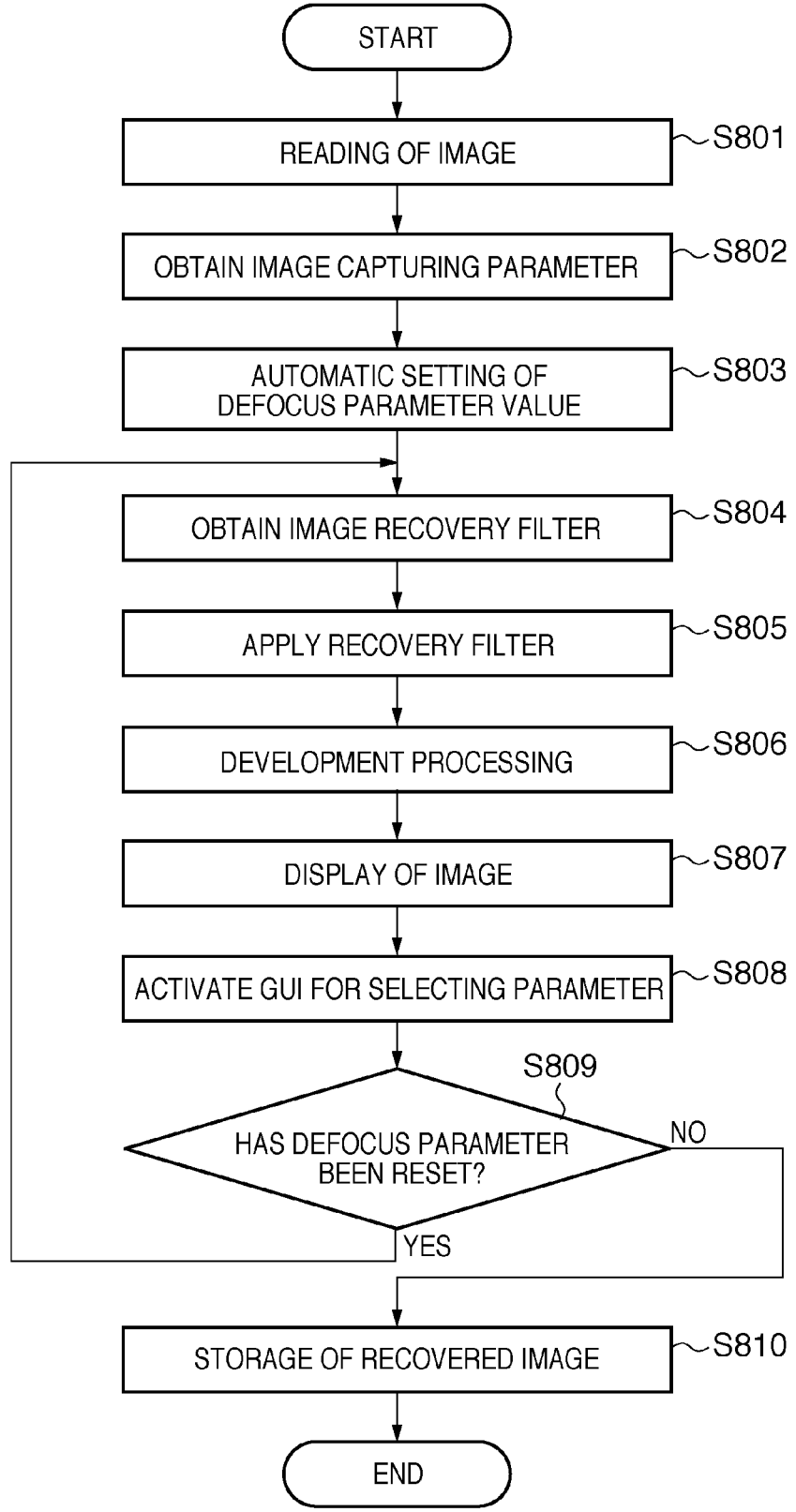
FIG. 8 is a flowchart showing image recovery processing according to a second embodiment.

A system configuration according to the second embodiment is similar to that in FIG. 1 of the first embodiment described above, and therefore descriptions thereof have been omitted. The following is a description of image recovery processing performed by an image recovery unit 121 according to the second embodiment, with reference to the flowchart of FIG. 8. This image recovery processing is started upon a user instruction given from the operation unit 118.

First, the image recovery unit 121 reads RAW image data captured by the imaging optical system 101 in step S801. Next, an image capturing parameter stored in the storage unit 117 in association with image data that is targeted for processing is read in step S802. Then, an initial value of a defocus parameter is decided in step S803, at which time the initial value may be set to 0, for example. Then, a recovery filter corresponding to the defocus parameter and the image capturing parameter is obtained from the storage unit 117 in step S804. Then, the recovery filter obtained in step S804 is applied to the RAW image data, and image recovery processing is performed in step S805.

After this, development processing such as demosaicing is performed on RAW image data after having undergone image recovery in step S806, and a developed image is displayed on the display unit 119 in step S807. Then, a GUI for changing a defocus parameter value is displayed on the display unit 119 in step S808. The details of the GUI will be described later. Then, if the user has determined that the current image recovery state is unfavorable as a result of checking the display on the GUI in step S808, the defocus parameter value is changed (reset) in step S809 and the procedure returns to step S804. On the other hand, if the user has not changed the defocus parameter value in step S809, then an image obtained after image recovery is stored in step S810, and the procedure is ended.

Figure 9:
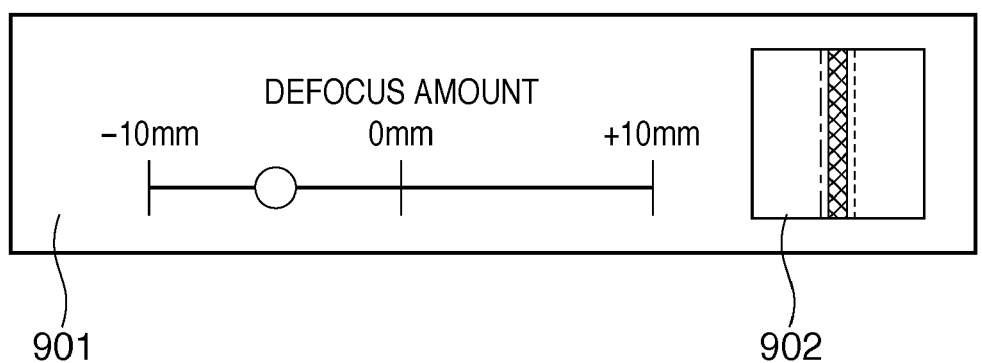
FIG. 9 is a diagram showing an example of a GUI for setting a defocus parameter according to the second embodiment.

Here, an example of the GUI for setting a defocus parameter value, displayed in step S808, is shown in FIG. 9. In FIG. 9, reference numeral 901 designates a slider that enables the user to adjust the defocus parameter value by correcting a focus position. The range of the defocus parameter that can be selected by the user may be the range of image recoverable distances. Specifically, the range of image recoverable distances is the range of distances that includes no point at which the OTF becomes 0 during defocus, and this range depends on the focal length. Although this range can be calculated if the image capturing parameter has already been obtained in step S802, the range may be calculated at the time when the GUI is displayed in step S808. Reference numeral 902 designates an image display region that is provided so that the user can easily check the effect of image recovery and in which a magnified image of part of the object is displayed, for example.

As described above, according to the second embodiment, applying a defocus parameter to image recovery enables a favorable recovered image to be obtained even if a slight defocus occurs.

Note that the defocus parameter according to the second embodiment may be any parameter as long as the parameter indicates the amount of difference between the object distance and the focal length. Accordingly, not only the above-described difference between the object distance and the focal length, but also, for example, the ratio between the object distance and the focal length may be used as a defocus parameter. Moreover, although an example of holding multiple recovery filters corresponding to multiple defocus parameters in advance has been described in the second embodiment, such recovery filters may be calculated during recovery processing as in the first embodiment.

It should also be noted that, although an example of performing image recovery in an image capturing apparatus, such as a camera, has been described in the first and second embodiments, the present invention is not limited to use in the image capturing apparatus, and similar image recovery processing may also be performed in an image processing apparatus that is different from the image capturing apparatus. In other words, the present invention can also be achieved by inputting a captured image obtained by an image capturing apparatus to an image processing apparatus and then performing similar recovery processing as described above in the first and second embodiments. Similarly, it is also possible to input a captured image held in an external device via the media I/F 114 to the above-described image capturing apparatus of the first and second embodiments and perform recovery processing on the input captured image. In this case, an image capturing parameter to be required may be read from information attached to the captured image.

According to the present invention with the above-described configuration, a favorable recovered image can be obtained by performing image recovery taking into consideration variations in optical characteristics of an imaging optical system.

Other Embodiments

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-273997 filed on Dec. 1, 2009, which is hereby incorporated by reference herein in its entirety.

What is claimed is:

1. An image apparatus comprising:
   an image obtaining unit configured to obtain a captured image of an object captured by an imaging optical system;
   a parameter value setting unit configured to set a value of a parameter indicating a factor determining optical characteristics of the imaging optical system;
   an optical characteristics obtaining unit configured to obtain optical characteristics of the imaging optical system during capture of the captured image;
   a recovery filter determining unit configured to determine a recovery filter to be used to correct the deterioration of the image quality of the captured image due to optical characteristics of the imaging optical system, based on the obtained optical characteristics and the value of the parameter; and
   an image recovery unit configured to perform recovery processing by applying the determined recovery filter to the captured image,
   wherein the factor determining the optical characteristics of the imaging optical system does not depend only an optical design parameter of the imaging optical system.

2. The image apparatus according to claim 1, wherein the factor determining the optical characteristics of the imaging optical system is a spectrum of the object.

3. The image apparatus according to claim 1, wherein the factor determining the optical characteristics of the imaging optical system comprises the difference between the distance to the object and the focal length in the imaging optical system.

4. The image apparatus according to claim 1, wherein the parameter value setting unit sets the value of the parameter in accordance with a user instruction.

5. The image apparatus according to claim 4, further comprising:
   a display unit configured to display a recovered image obtained by performing recovery processing on the captured image in the image recovery unit.

6. The image apparatus according to claim 2, wherein the parameter value setting unit sets the value of the parameter through a computation based on the captured image.

7. The image apparatus according to claim 1, wherein each factor determining the optical characteristics of the imaging optical system is indicated by a plurality of parameters.

8. The image apparatus according to claim 1, wherein the image recovery unit performs recovery processing using an optical transfer function of the imaging optical system.

9. An image processing method comprising:
   obtaining a captured image of an object captured by an imaging optical system;
   setting a value of a parameter indicating a factor determining optical characteristics of the imaging optical system;
   obtaining optical characteristics of the imaging optical system during capture of the captured image;
   determining a recovery filter to be used to correct the deterioration of the image quality of the captured image due to optical characteristics of the imaging optical system, based on the obtained optical characteristics and the value of the parameter; and
   performing recovery processing by applying the recovery filter to the captured image,
   wherein the factor determining the optical characteristics of the imaging optical system does not depend only an optical design parameter of the imaging optical system.

10. A computer-readable storage medium storing a computer program for causing a computer to perform each step in the image processing method according to claim 9.

* * * * *